United States Patent [19]

Marquess

[11] 4,338,819
[45] Jul. 13, 1982

[54] ACCELEROMETER INCLUDING AN OVERALL ARRANGEMENT FOR REDUCING TEMPERATURE RELATED ERRORS

[75] Inventor: Richard D. Marquess, Concord, Calif.

[73] Assignee: Systron-Donner Corporation, Concord, Calif.

[21] Appl. No.: 185,246

[22] Filed: Sep. 8, 1980

[51] Int. Cl.³ .............................................. G01P 15/13
[52] U.S. Cl. ..................................................... 73/497
[58] Field of Search ......................... 73/497, 520, 708

[56] References Cited

U.S. PATENT DOCUMENTS

| 937,099 | 10/1909 | Schulze | 73/520 |
| 3,498,138 | 3/1970 | Stewart | 73/517 B |
| 3,789,672 | 2/1974 | Davies | 73/497 |

Primary Examiner—James J. Gill
Attorney, Agent, or Firm—Flehr, Hohbach, Test, Albritton & Herbert

[57] ABSTRACT

A pendulous type of oil filled accelerometer is disclosed herein, specifically one which is sensitive to temperature changes sufficient to introduce a temperature related error into its output signal, if left uncorrected. A technique which compensates for these temperature changes in order to reduce the resultant error to an acceptable level is also disclosed herein. This technique uses the oil itself, specifically its sensitivity to changes in temperature resulting in changes in its density, in combination with an expandable/contractible bellows.

7 Claims, 5 Drawing Figures

ACCELEROMETER INCLUDING AN OVERALL ARRANGEMENT FOR REDUCING TEMPERATURE RELATED ERRORS

The present invention relates generally to a pendulous type of accelerometer and more particularly to a pendulous type of oil filled linear accelerometer which is sensitive to internal temperature changes sufficient to cause distortion of its output signal unless corrected.

An oil filled accelerometer of the general type just recited typically includes a housing containing a sealed chamber filled with oil, a magnetic circuit arrangement located within the oil filled chamber for the purpose of providing a magnetic field displaying a particular flux density in a given area within the chamber, and an arrangement of additional components cooperating with the magnetic field for producing an electrical output signal corresponding to the acceleration to which the overall apparatus is subjected. Included among these additional components is a pendulous member mounted for pivotal movement within the oil filled chamber and having a current carrying torque coil located within and responsive to the magnetic field provided by the magnetic circuit arrangement. This latter arrangement typically includes a magnet, a pole piece and a return path which together define a gap within which the magnetic field is provided and into which the current carrying torque coil of the pendulous member is located. This particular electromagnetic/mechanical configuration which is well known in the art serves to apply a force on the pendulous member in opposition to the force which is applied thereto as a result of acceleration. This counterforce is used to maintain the pendulous member in a fixed position regardless of the acceleration forces applied thereto and requires a particular amount of current to accomplish this. This current which corresponds to and serves as a measure of the acceleration to which the pendulous member is subjected is used in providing the previously mentioned output signal.

For the output signal just recited to be accurate with respect to acceleration, it is assumed that the previously recited magnetic field displays a constant flux density. However, in the past this has not been true for accelerometers using magnetic circuit arrangements constructed of conventional components including specifically temperature sensitive Alnico 9 (a particular and readily available alloy of al, ni and cobalt) as its magnetic material. The magnetism of this material varies inversely with temperature, although the amount of variation is relatively small and therefore can be compensated for or at least approximately compensated for by using the temperature-sensitive density characteristics of a properly selected oil within the housing chamber. More specifically, as is well known in the art, the particular oil within the housing chamber can be selected such that its density varies inversely with the temperature changes in the oil chamber so as to affect the pivotal movement of the pendulous member therein in a way which is sufficient to compensate for or approximately compensate for the variation in magnetism caused by the magnetic material.

The temperature compensating approach just described is known in the art and to date has been found to be satisfactory, so long as the changes in magnetism with temperature are not so great that the changes in density of the oil sufficiently compensate for these changes.

However, as will be seen hereinafter, the accelerometer disclosed herein is one which uses samarium cobalt ($SmCo_5$) as its magnetic material forming part of the previously described magnetic circuit arrangement. While this material has a number of advantages over the previously used Alnico 9, it does carry with it one disadvantage. Specifically, samarium cobalt is significantly more temperature sensitive than Alnico 9, that is, its change in magnetism with temperature is greater than that of Alnico 9. Moreover, this difference is sufficiently great that the compensating technique described above using the chamber oil is not always adequate. This results in an output signal which does not accurately reflect acceleration, that is, an output signal containing a temperature related error (hereinafter referred to as "distortion").

In view of the foregoing, one object of the present invention is to provide an adequate temperature compensating technique for use in accelerometers of the general type recited above and specifically those which include magnet material such as samarium cobalt which is significantly more sensitive to temperature than the Alnico 9 material used previously.

Another object of the present invention is to provide a temperature compensating technique which is uncomplicated, reliable and yet economical to provide.

A more particular object of the invention is to provide a pendulous type of oil filled accelerometer which utilizes its oil, specifically the temperature sensitive density characteristic of its oil, as one means of compensating for internal temperature changes, and a second separate temperature compensating means which in combination with the first means substantially reduces the temperature related error in the accelerometer's output signal, e.g., signal distortion, even if the accelerometer uses magnetic material such as samarium cobalt displaying relatively high temperature sensitivity.

Another specific object of the present invention is to provide an accelerometer of the type just recited in which the volume of its temperature compensating oil varies directly with temperature and in which the second mentioned temperature compensating means also acts to compensate for this change in volume.

As will be described in more detail hereinafter, the accelerometer disclosed herein is one which includes a closed housing, preferably one which contains the previously recited sealed chamber filled with oil. A magnetic circuit arrangement of the general type previously recited is located within the housing for the purpose of providing a magnetic field having a particular, constant flux density in a given area within the housing. Means including a pendulous member mounted for pivotal movement within the housing and having a current carrying torque coil located within and responsive to the magnetic field is also provided for producing an electrical output signal. This output signal corresponds to the accleration to which the apparatus and specifically the pendulous member is subjected, so long as the flux density of the magnetic field remains constant. Moreover, the magnetic circuit arrangement contains temperature sensitive magnetic material which is sufficient to cause the flux density to vary inversely with changes in temperature within the accelerometer housing and, if uncorrected, causes the electrical output signal to contain temperature related errors or distortion such that the output signal does not correspond to acceleration.

In accordance with the present invention, the temperature sensitive material forming part of the magnetic circuit arrangement is compensated for so as to substantially reduce temperature related errors in the accelerometer's output signal resulting from ambient temperature changes. This is accomplished, at least in part, by the provision of means for reducing the amount of the change in flux density of the magnetic field as a result of temperature changes, whereby to reduce the temperature related error, that is, signal distortion. In an oil filled accelerometer, this flux reducing means is preferably combined with the previously recited compensating technique using the temperature-sensitive density characteristic of its oil for reducing the temperature related error to an acceptable level.

The various features just recited and other features making up the overall accelerometer disclosed herein will be described in more detail hereinafter in conjunction with the drawings wherein.

Figure 1:
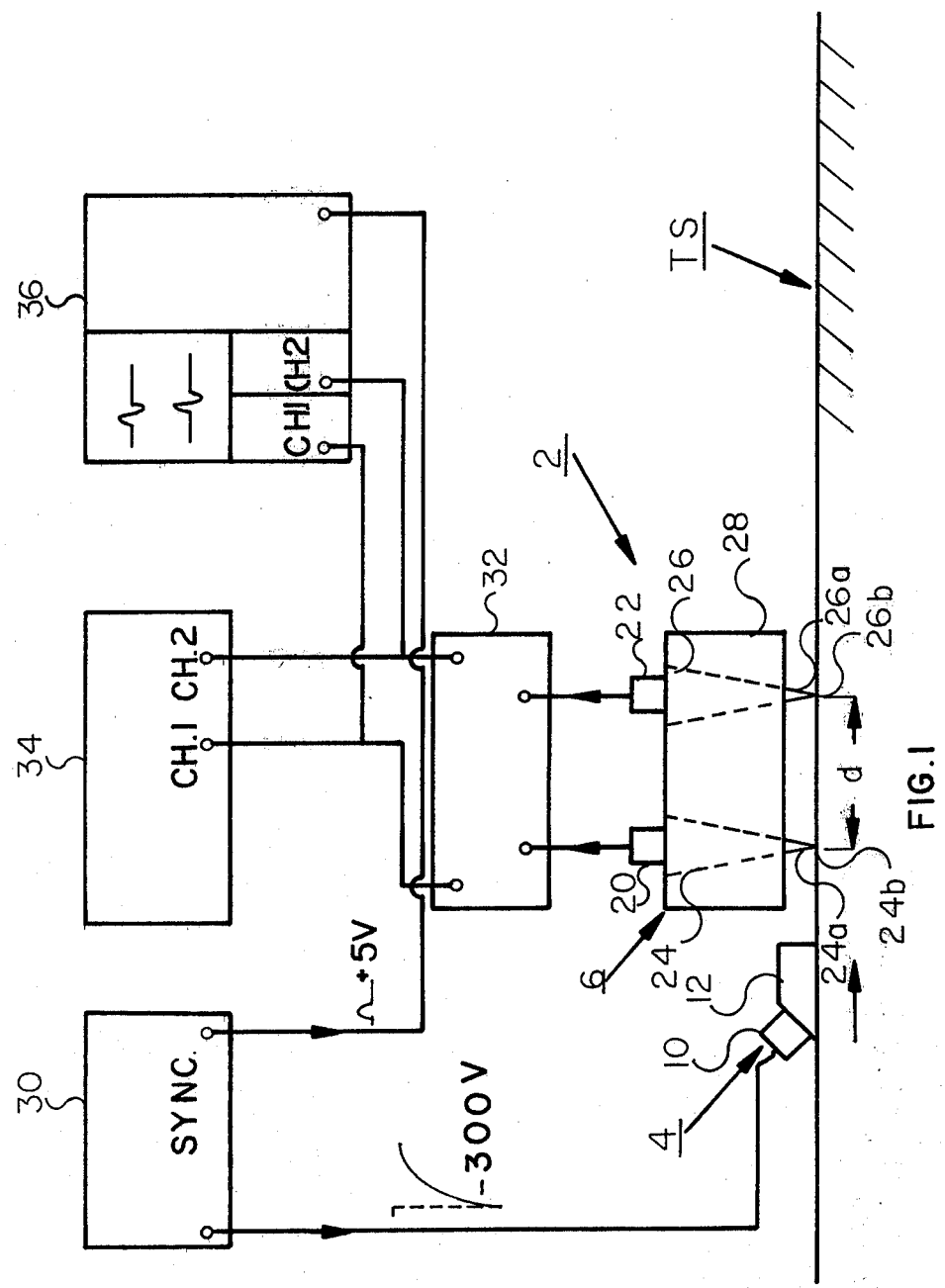
FIG. 1 is a broken away plan view illustrating pertinent portions of a pendulous type of oil filled linear accelerometer apparatus designed in accordance with the present invention.
Figure 2:
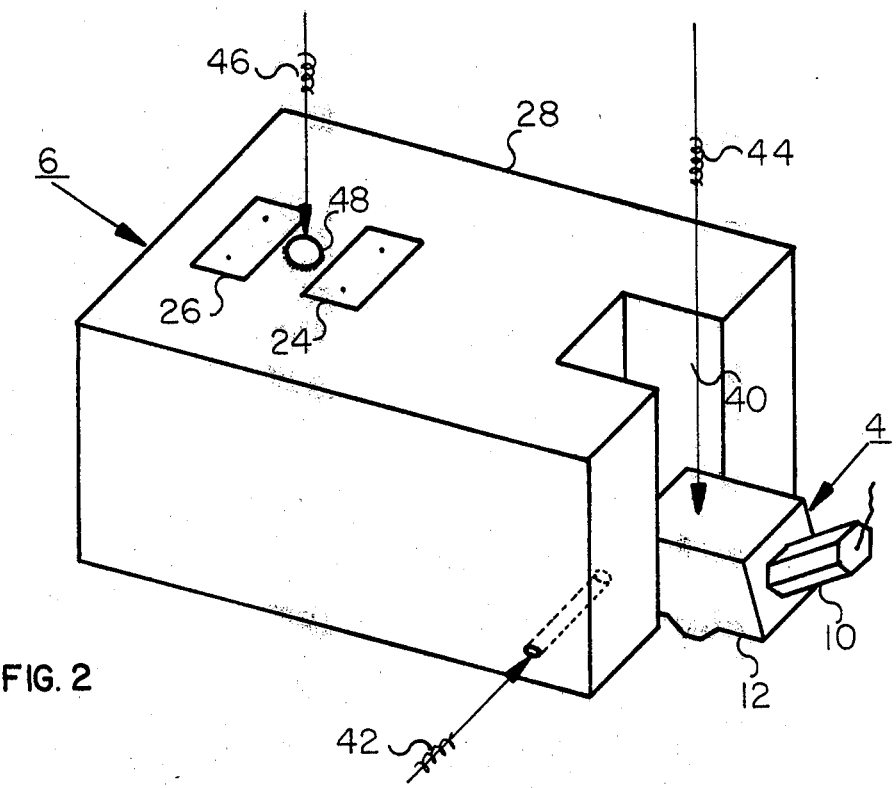
FIG. 2 is a sectional view of the accelerometer of FIG. 1 taken generally along line 2—2 in FIG. 1.

Turning now to the drawings, wherein like components are designated by like reference numerals throughout the various figures, attention is first directed to FIGS. 1 and 2 which, as stated previously, illustrate certain aspects of a pendulous type of oil filled linear accelerometer apparatus. This apparatus is generally indicated by the reference numeral 10 and is shown including an outer housing or casing 12 containing a sealed chamber 14, preferably a hermetically sealed chamber, filled with oil of the type typically used in oil filled accelerometers, for example Silicone oil. In any event, for reasons to be discussed hereinafter, the oil selected is preferably one which varies inversely in density with changes in temperature within its chamber 14 to partially compensate for the temperature sensitive magnetic material used, as described above.

Accelerometer apparatus 10 also includes a magnetic circuit arrangement which is generally indicated at 18 and which is located within the oil filled chamber. This arrangement includes a disc shaped magnet 20 and a similarly shaped pole piece 22 in engaging side-by-side relationship with one another, as best seen in FIG. 2. As best seen in FIG. 1, the magnetic circuit arrangement also includes a magnetic return path 24 in the form of two arcuate sections of flux conductive material spaced radially outwardly from and extending around most of the combined outer periphery of the magnet and its associated pole piece. Structurally, the magnet, its pole piece and the return path with other (known) components within housing 12 provide an annular gap 26 around pole piece 22. From a magnetic standpoint, arrangement 18 provides within gap 26 a magnetic field which is intended to have a particular, constant flux density. However, magnet 20 is formed from temperature sensitive magnetic material, specifically samarium cobalt in a preferred embodiment, which material is sufficient to cause the flux density within the gap to vary inversely from its intended density with changes in temperatures within chamber 14. As will be seen below, unless corrected, this adversely affects the operation of overall apparatus 10.

Accelerometer apparatus 10 also contains within its oil filled chamber a pendulous member 28 which is suitably mounted for pivotal movement therein. As seen best in FIG. 1, the pendulous member includes a float 30 located below magnet circuit arrangement 18, a paddle 32 located above the arrangement (see FIG. 2) and an annular bobbin 34 which is located within gap 26 and which supports a current carrying torque coil 36.

The various components of accelerometer apparatus 10 thus far described are well known in the art and do not alone form the present invention. The pendulous member and other known components forming part of the overall apparatus together cooperate with the magnetic circuit arrangement, specifically its magnetic field within gap 26, to produce an electrical output signal. This output signal corresponds to the acceleration to which the apparatus and specifically its pendulous member is subjected, that is, so long as the magnetic field within gap 26 remains at the intended flux density. As stated above, this is not the case, unless compensated for, because of the use of samarium cobalt in providing magnet 20. As a result, unless compensated for, any changes in temperature within chamber 16 will cause the flux density of the magnetic field in gap 26 to change, thereby introducing a temperature related error into the electrical output signal such that the latter does not correspond to acceleration. As discussed previously, this error is partially corrected as a result of the temperature sensitive density characteristic of oil 16. However, as also discussed previously, because of the use of samarium cobalt or possibly other highly temperature sensitive magnetic materials, the oil itself is not sufficient to completely eliminate the error or reduce it to an acceptable level. As a result, overall acceleration apparatus 10 includes a second temperature compensating arrangement which is generally indicated at 38 in FIG. 2 and which will be discussed in more detail hereinafter in conjunction with FIGS. 3, 4A and 4B.

Before proceeding with the discussion of arrangement 38, it should be again emphasized that the various components of apparatus 10 thus far described and the way they function to provide the previously recited electrical output signal are conventional and do not require further description. This includes the particular way in which the oil within chamber 14 partially corrects for the temperature related error using its temperature sensitive density characteristics. However, the particular use of samarium cobalt or possibly other highly temperature sensitive magnetic materials as magnet 20 is not conventional and, as stated previously, its use requires further temperature compensation over and above oil 16.

Figure 3:
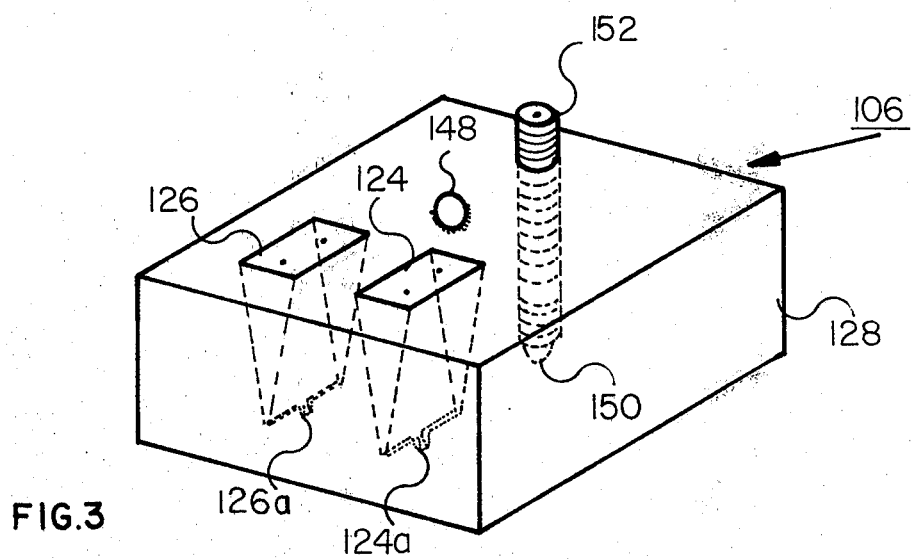
FIG. 3 is a diagrammatic illustration in perspective view of certain components forming part of the accelerometer apparatus shown in FIGS. 1 and 2, specifically illustrating a temperature compensating arrangement designed in accordance with the present invention.
Figure 4:
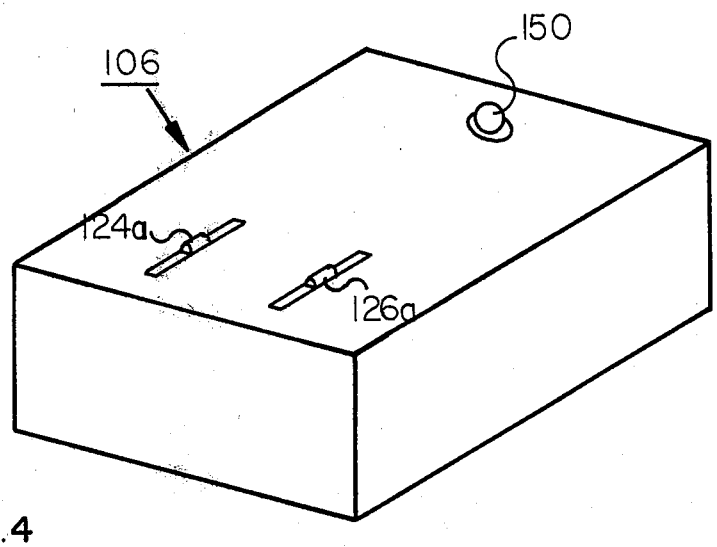
FIG. 4A is a side elevational view of the arrangement of FIG. 3, specifically illustrating the arrangement in a first operating position.
FIG. 4B is a side elevational view of the arrangement of FIG. 3, specifically illustrating the arrangement in a second operating position.
Figure 5:
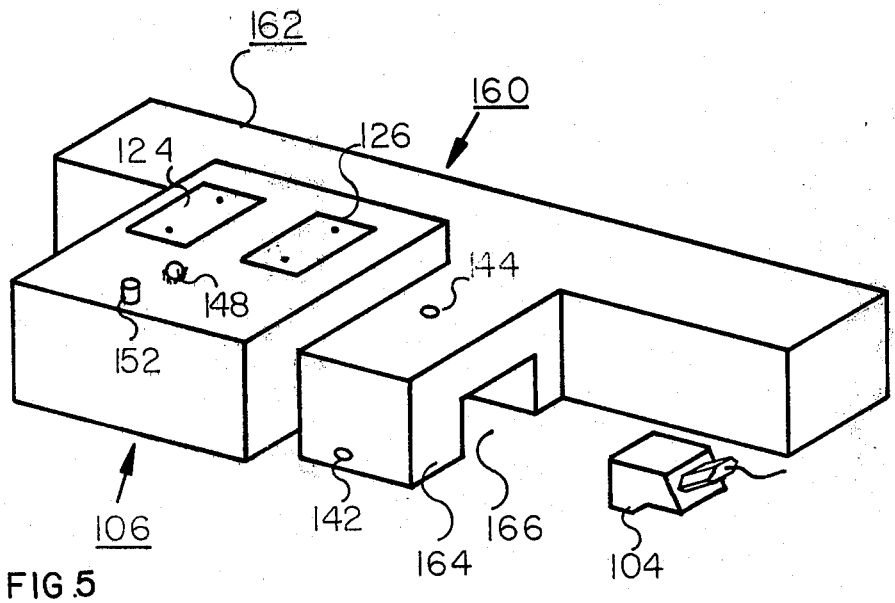

Referring to FIGS. 3, 4A and 4B overall magnetic circuit arrangement 18 and pendulous member 28 are shown apart from the rest of the conventional components making up accelerometer apparatus 10. In addition, temperature compensating arrangement 38 is shown in all three of these latter figures. In a preferred embodiment, arrangement 38 consists of a bellows including an end plate 40 and bellowed sidewall 42 located within oil filled chamber 14. For reasons to be discussed below, the end plate is constructed of a material which conducts magnetic flux, at least to a limited extent, and the bellowed sidewall is designed to contract with increases in the oil volume in chamber 14 and expand with decreases in oil volume. This contracting-/expanding aspect of the bellows in and by itself is known in the art and readily providable. In a preferred embodiment, the end plate 40 and its bellowed sidewall are constructed of steel or an alloy thereof. As best seen in FIGS. 4A and 4B, sidewall 42 supports end plate 40 in confronting spaced relationship with one side of magnetic circuit arrangement 18. The other end of the bellowed sidewall is fixedly supported in place adjacent an inner surface of housing 12, as seen in FIG. 2.

From an operational standpoint, apparatus 10 is designed so that the spacing between end plate 40 of compensating arrangement 38 is a distance D from magnetic circuit arrangement 18 when the temperature within chamber 14 corresponds to the intended flux density of the magnetic field in gap 26, as illustrated in FIG. 2. Under these circumstances, because of the magnetically conductive material making up the end plate, a certain predetermined amount of flux is allowed to leak across gap 26 to the end plate. This flux leakage will remain constant so long as the spacing between the end plate and the magnetic circuit arrangement does not change and so long as other possible leakage paths do not change. However, should the temperature within chamber 14 increase, the magnetism produced by magnet 20 will decrease and, at the same time, the increased temperature will cause the oil within chamber 14 to expand in volume, thereby causing the bellowed sidewall to contract. This, in turn, will increase the spacing between end plate 40 and arrangement 18, as illustrated in FIG. 4A by the increased spacing $D_1$. As a result of this increased spacing, the amount of flux leakage taking place between gap 26 and the end plate is reduced, thereby increasing the amount of flux remaining in gap 26. By selecting the proper positional relationship between the bellows and arrangement 18, the amount of decrease in flux leakage across the gap can be made to at least approximately compensate for the loss in flux density in the gap attributed to the decrease in magnetism. In a similar manner, should the temperature within the chamber decrease an incremental amount, the flux density in gap 26 will increase. However, at the same time, the oil within chamber 14 will decrease in volume causing the bellowed sidewall 42 to expand, thereby decreasing the spacing between end plate 40 and arrangement 18. This is illustrated in FIG. 4B by the decreased spacing $D_2$. As a result of this decreased spacing, the flux leakage across the spacing is increased, specifically an amount sufficient to partially compensate for the increase in gap flux so as to reduce the latter towards its intended value.

By using temperature compensating arrangement 38 in conjunction with the temperature sensitive density characteristics of oil 16, the temperature related error in the accelerometer output signal can be reduced to an acceptable level. The specific use of the bellows as arrangement 38 is especially appealing since the bellows also serves a second, known use. More specifically, oil 16 not only has temperature sensitive density characteristics but also temperature sensitive volume characteristics as briefly discussed above. As stated, when the temperature within chamber 14 increases, the volume of oil 16 increases and as the temperature decreases oil volume decreases. However, at the same time, the bellows forming arrangement 38 is caused to contract with and by increased oil volume, thereby enlarging the chamber for the increase in oil volume, and expands with and by decreased oil volume, thereby reducing the size of the chamber. Therefore, it should be quite apparent that the use of a bellows as temperature compensating arrangement 38 is quite desirable. Nevertheless, it is to be understood, that arrangement 38 could be provided in other forms so long as it functions to provide the variable flux leakage path described above. Moreover, whether a bellows or other means are used, the present invention is not limited for use in oil filled accelerometers and/or the particular accelerometer described above but could be incorporated into other types of accelerometers. In any of these cases, the position relationship between the bellows or other such means and the magnetic circuit arrangement to obtain the described compensation can be readily provided in view of the foregoing.

What is claimed is:

1. In a pendulous type of accelerometer apparatus, a closed housing, a magnetic circuit arrangement located within said housing for the purpose of providing a magnetic field having a given constant flux density in a given area within said housing, means including a pendulous member mounted for pivotal movement within said housing and having a current carrying torque coil located within and responsive to said magnetic field for producing an electrical output signal corresponding to the acceleration to which said apparatus is subjected, said magnetic circuit arrangement containing temperature sensitive magnetic material which is sufficient to cause the flux density within said magnetic field to vary inversely with changes in temperature within said closed housing and thereby introduce a temperature related error into said electrical output signal such that the latter does not correspond to said acceleration, and temperature compensating means for reducing said temperature related error, said compensating means including means for reducing the amount of change in flux density of said magnetic field as a result of said temperature changes so as to provide said temperature related error reduction said change in flux density reducing means including flux leakage means located within said housing and acting on said magnetic circuit arrangement for causing a constant amount of flux to leak from said magnetic field when the latter displays said given flux density at a corresponding temperature within said chamber, said flux leakage means varying the amount of flux which leaks from said field in response to and inversely with said temperature changes for providing said reduction in the amount of change in flux density of said magnetic field caused by said temperature changes, said flux leakage means including a flux conductive plate-like member located in spaced relationship with said magnetic circuit arrangement, and means supporting said member such that the spacing between the latter and said magnetic circuit arrangement varies directly with said temperature changes so as to provide said varying amount of flux leakage, said plate-like member and supporting means together forming a bellows which expands with decreases in said temperature changes and contracts with increases in said temperature changes, said housing being a sealed housing containing oil which surrounds said pendulous member, magnetic circuit arrangement and said bellows, said oil being of a type which changes in volume directly with said temperature changes, said bellows expanding with and as a result of decreases in said oil volume and contracting with and as a result of increases in said oil volume whereby to provide said spacing variation and to compensate for said changes in volume.

2. An accelerometer apparatus according to claim 1 wherein said oil is of a type which varies inversely in density with said temperature changes so as to affect the pivotal movement of said pendulous member in a way which is sufficient to further reduce said temperature related error.

3. An accelerometer apparatus according to claim 1 wherein said magnetic material is $SmCo_5$.

4. In a pendulous type of oil filled linear accelerometer apparatus, a housing containing a sealed chamber filled with oil which varies inversely in density with changes in temperature and, at the same time, which varies directly in volume with said temperature changes, a magnetic circuit arrangement located within said oil filled chamber for the purpose of providing a magnetic field having a particular flux density in a given area, means including a pendulous member mounted for pivotal movement within said housing and having a current carrying torque coil located within and responsive to said magnetic field for producing an electrical output signal corresponding to the acceleration to which said apparatus is subjected, said magnetic circuit arrangement containing temperature sensitive magnetic material which is sufficient to cause the flux density within said magnetic field to vary inversely from said particular density with said changes in temperature within said oil filled chamber and thereby introduce a temperature related error into said electrical output signal such that the latter does not correspond to said acceleration, and temperature compensating means for reducing said error, said compensating means including said oil which varies inversely in density with said temperature changes so as to affect the pivotal movement of said pendulous member in a way which is sufficient to reduce but not eliminate said temperature related error, said temperature compensating means also including a bellows located within said oil filled chamber and having an end plate and bellowed sidewall supporting the end plate in spaced relationship with said magnetic circuit arrangement, said bellowed sidewall being formed of a material which contracts with and by increases in the volume of oil in said chamber and therefore increases in said temperature changes and which expands with and by decreases in said oil volume and therefore decreases in said temperature changes, and said end plate being formed of a material which conducts magnetic flux, at least to a limited extent, said bellows contracting and expanding with increases and decreases in said oil volume and temperature changes, respectively, so as to cause the spacing between said plate and said circuit arrangement to vary in a way which draws varying amounts of flux away from said magnetic field sufficient to reduce the amount of change in flux density of said magnetic field as a result of said temperature changes, whereby to reduce said temperature related error.

5. An accelerometer apparatus according to claim 3 wherein said magnetic circuit arrangement includes a magnet serving as said magnetic material, a connected pole piece and a member which serves as a return path and which together with said magnet and pole piece define a gap forming said given area within which said magnetic field is provided.

6. An accelerometer apparatus according to claim 4 wherein said magnetic material is $SmCo_5$.

7. In a pendulous type of oil filled linear accelerometer apparatus, a housing containing a sealed chamber filled with oil which varies directly in volume with said temperature changes, a magnetic circuit arrangement located within said oil filled chamber for the purpose of providing a magnetic field having a particular flux density in a given area, means responsive to the flux density of said magnetic field and to the acceleration to which said apparatus is subjected for producing an electrical output signal corresponding to said acceleration, said magnetic circuit arrangement containing temperature sensitive magnetic material which is sufficient to cause the flux density within said magnetic field to vary inversely from said particular density with said changes in temperature within said oil filled chamber and thereby introduce a temperature related error into said electrical output signal such that the latter does not correspond to said acceleration, and temperature compensating means for reducing said error, said compensating means including an arrangement located within said oil filled chamber and having first means and second means for supporting said first means in spaced relationship with said magnetic circuit arrangement, said second means being designed to contract with and by increases in the volume of oil in said chamber and therefore increases in said temperature changes and to expand with and by decreases in said oil volume and therefore decreases in said temperature changes, and said first means being formed of a material which conducts magnetic flux, at least to a limited extent, said second means contracting and expanding with increases and decreases in said oil volume and temperature changes, respectively, so as to cause the spacing between said first means and said circuit arrangement to vary in a way which draws varying amounts of flux away from said magnetic field sufficient to reduce the amount of change in flux density of said magnetic field as a result of said temperature changes, whereby to reduce said temperature related error.

* * * * *

UNITED STATES PATENT AND TRADEMARK OFFICE
CERTIFICATE OF CORRECTION

PATENT NO.  : 4,338,819

DATED       : July 13, 1982

INVENTOR(S) : Richard D. Marquess

It is certified that error appears in the above-identified patent and that said Letters Patent is hereby corrected as shown below:

On the title page cancel the Fig. of drawing and substitue the Fig. shown below.

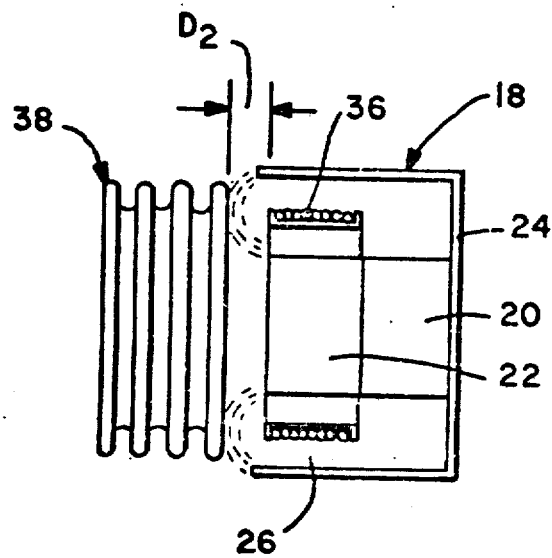

Figures 1, 2, 3, 4A and 4B of the drawings should appear as per attached sheets.

UNITED STATES PATENT AND TRADEMARK OFFICE
CERTIFICATE OF CORRECTION

PATENT NO. : 4,338,819

DATED : July 13, 1982

INVENTOR(S) : Richard D. Marquess

It is certified that error appears in the above—identified patent and that said Letters Patent is hereby corrected as shown below:

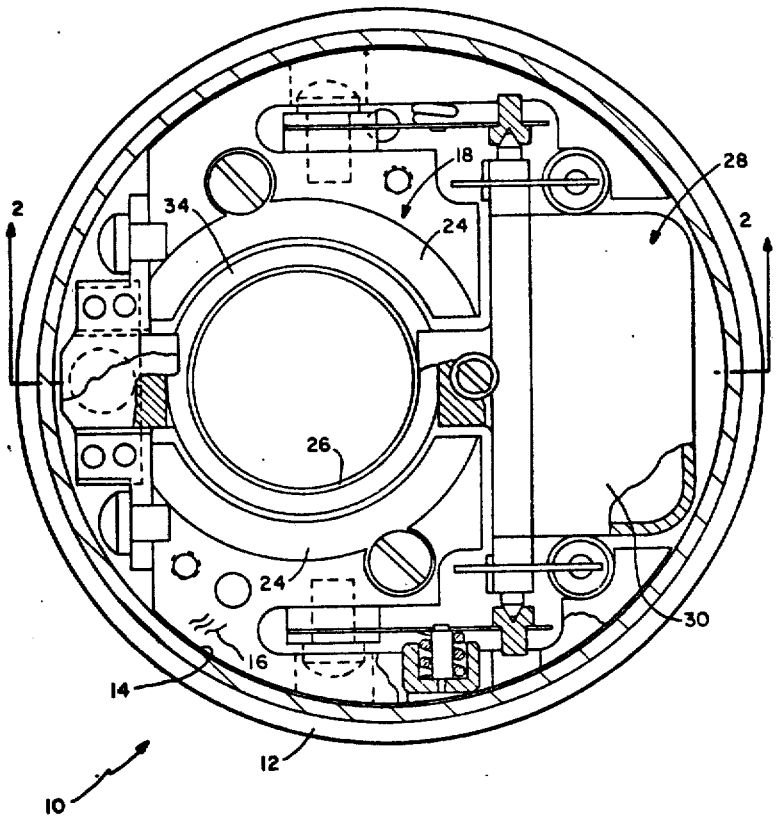

FIG.—1

UNITED STATES PATENT AND TRADEMARK OFFICE
CERTIFICATE OF CORRECTION

PATENT NO. : 4,338,819  
DATED : July 13, 1982  
INVENTOR(S) : Richard D. Marquess Page 3 of 5

It is certified that error appears in the above—identified patent and that said Letters Patent is hereby corrected as shown below:

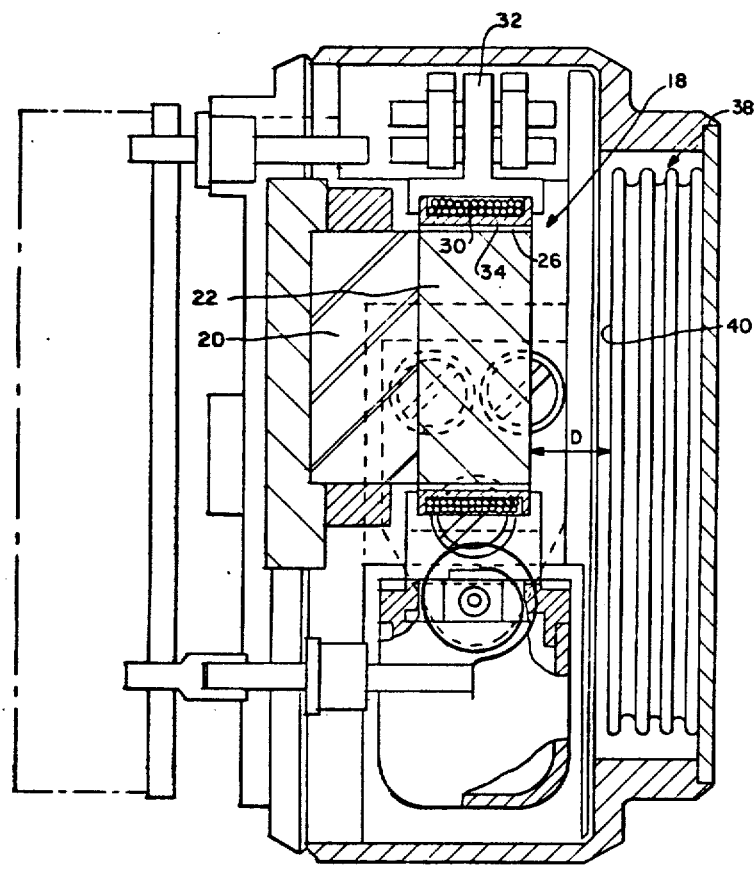

FIG.—2

UNITED STATES PATENT AND TRADEMARK OFFICE
CERTIFICATE OF CORRECTION

PATENT NO. : 4,338,819

DATED : July 13, 1982

INVENTOR(S) : Richard D. Marquess

It is certified that error appears in the above—identified patent and that said Letters Patent is hereby corrected as shown below:

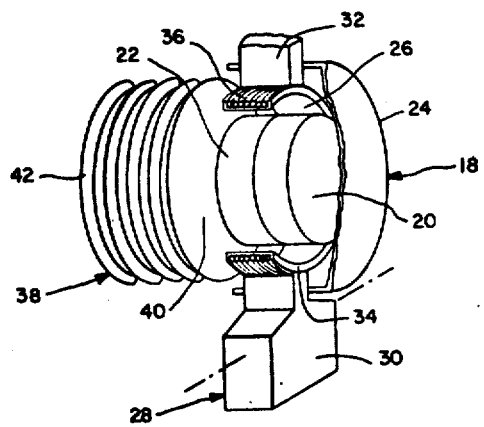

FIG.—3

UNITED STATES PATENT AND TRADEMARK OFFICE
CERTIFICATE OF CORRECTION

PATENT NO. : 4,338,819

DATED : July 13, 1982

INVENTOR(S) : Richard D. Marquess

It is certified that error appears in the above—identified patent and that said Letters Patent is hereby corrected as shown below:

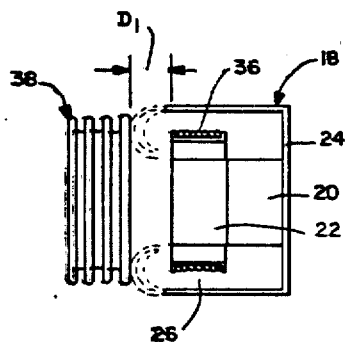

FIG.—4A

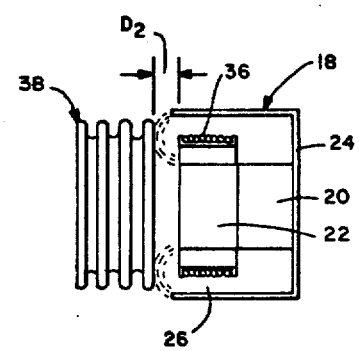

FIG.—4B

Signed and Sealed this

Thirtieth Day of November 1982

[SEAL]

Attest:

Attesting Officer

GERALD J. MOSSINGHOFF

Commissioner of Patents and Trademarks